United States Patent [19]
Sonohara et al.

[11] Patent Number: 5,583,979
[45] Date of Patent: Dec. 10, 1996

[54] METHOD OF AND APPARATUS FOR CONTROLLING REPRODUCTION OF IMAGE DATA

[75] Inventors: Satoshi Sonohara; Shigeki Furuta; Hitoshi Matsumoto, all of Kawasaki; Motoyuki Morita, Tokyo, all of Japan

[73] Assignee: Fujitsu Limited, Kawasaki, Japan

[21] Appl. No.: 138,088

[22] Filed: Oct. 20, 1993

[30]  Foreign Application Priority Data

Nov. 2, 1992 [JP] Japan ................................. 4-294658

[51] Int. Cl.$^6$ ........................................... G06F 3/00
[52] U.S. Cl. ..................... 395/173; 364/514 R; 348/415; 348/439
[58] Field of Search ..................... 395/154, 152; 364/514 R; 348/409, 415, 439, 459

[56]  References Cited

U.S. PATENT DOCUMENTS

| | | | |
|---|---|---|---|
| 4,468,708 | 8/1984 | Coleman, Jr. | 348/409 X |
| 5,046,026 | 9/1991 | Tolomei | 364/521 |
| 5,093,907 | 3/1992 | Hwong et al. | 395/152 |
| 5,249,048 | 9/1993 | Sugiyama | 348/415 |
| 5,420,801 | 5/1995 | Dockter et al. | 364/514 R |

*Primary Examiner*—Mark K. Zimmerman
*Attorney, Agent, or Firm*—Staas & Halsey

[57] ABSTRACT

The method comprises a read-out step for reading out the image data from a predetermined recording medium according to a frame unit; an image outputting step for image-outputting the frame data read out in the read-out step; a time measuring step for measuring a reproductive processing time taken from a start of reading out in the read-out step to an end of outputting of an image in the image outputting step according to a frame unit; a predicting step for predicting an image output time of next frame data to be reproduced next to the frame data on the basis of the reproductive processing time measured in the time measuring step; a detecting step for detecting an image output time set per frame data from the image data; and a determining step for determining next frame data to be reproduced next to the frame data in accordance with the image output time predicted in the predicting step and the image output time detected in the detecting step.

12 Claims, 7 Drawing Sheets

METHOD OF AND APPARATUS FOR CONTROLLING REPRODUCTION OF IMAGE DATA

BACKGROUND OF THE INVENTION

1. Field of the Invention

The present invention relates to a method and an apparatus for controlling reproduction of image data.

2. Related Background of the Art

In recent years, development of a multimedia technology which synthetically deals with a plurality of media for audio data, image data, etc. has been proceeding. A method and apparatus capable of efficiently processing the data of the respective media have been demanded.

In particular, the image data is greater in terms of quantity than the audio data and, therefore, requires efficient processing.

A dynamic image data reproducing device generally for a domestic use may embrace, e.g., a magnetic tape reproducer, a magnetic disk reproducer, an optical disk reproducer, etc..

In the magnetic tape reproducer, an induced voltage generated between a magnetic substance on the tape surface and a magnetic head is amplified and shaped. The voltage is thereby converted into digital signals. The digital signals are further converted into analog signals. The analog signals are output from an image output unit as well as from an audio output unit.

More specifically, according to the magnetic tape reproducer, an array {N, N, S, N, S, S, N, S, N, . . . } of the magnetic substance is discriminated based on a waveform of the induced voltage. This array is converted into an array {1, 1, 0, 1, 0, 0, 1, 0, 1, . . . } of digital signals. Further, the magnetic tape reproducer is constructed to convert the digital signals into analog signals and output the analog signals from an image output unit such as a CRT (cathode ray tube), etc. and an audio output unit such as a loudspeaker, etc. This magnetic tape reproducer exhibits such a characteristic that the data is sequentially read in accordance with rotations of a reel for feeding and winding the magnetic tape.

The magnetic disk reproducer also reads the image data and the audio data on the basis of the array of the magnetic substance on the disk surface as in the magnetic tape reproducer. This magnetic disk reproducer is capable of reading the data recorded on the magnetic disk at random. That is, the magnetic head of the magnetic disk reproducer is movable between an outer edge and a central portion of the rotating disk. The magnetic head is therefore capable of immediately reading the data stored in an arbitrary location on the disk.

The optical disk reproducer is a device in which laser technology is introduced into the principle of the magnetic disk.

Namely, on the optical disk, the digital signals are recorded on a rugged portion on the disk surface which is termed a pit. In the optical disk reproducer, the disk surface is irradiated with a laser beam from the optical head. The signals are read on the assumption that a pit array is conceived as an array of the digital signals. Then, the optical disk reproducer converts the digital signals read from the optical disk into analog signals. The analog signals are outputted from the image output unit and the audio output unit. This optical disk reproducer is capable of reading the data at random as in the case of the magnetic disk reproducer described herein above.

Moreover, the optical disk reproducer has a characteristic in which the data can be read with no contact between the head for reading out the data and the disk. For this reason, a degradation both in the head and in the disk can be prevented in contrast with the magnetic tape reproducer where the head contacts the recording medium.

The magnetic tape reproducer has a higher spread rate among the image reproducing devices and is enough of software of the magnetic tape. The software of the magnetic tape includes, e.g., video software recorded with movie information, instructional video software in which the professionals in a variety of fields show their skills, enterprise introduction video software for recruiting the staff or improving images of enterprises, and video magazine software for introducing the items to be appeared on magazines in the form of dynamic images.

On the other hand, high-quality sounds and pictures can be recorded on the optical video disk, and hence software is recorded with images and sounds in a live musical performance.

Next, the operational principle of the dynamic image data reproducing device will be briefly explained.

The dynamic image data reproducing device reads the dynamic image data stored on the recording medium such as a magnetic tape, a magnetic disk or an optical disk according to a frame unit. Subsequently, the dynamic image data reproducing device outputs the frame data read out from the recording medium in the form of the image data and the audio data through a display unit and an output unit such as a loudspeaker.

Further, a method of recording each item of frame data while compressing the data is given as a method of recording the dynamic image data. When using this method, the dynamic image data reproducing device performs an extension process based on a compression process algorithm with respect to the dynamic image data. The dynamic image data reproducing device thereafter outputs the image data and the audio data. According to this method, recording areas on the recording medium are usable at a high efficiency.

Here exist multiple types of dynamic image data reproducing devices. Performances of a processor and a memory employed for the dynamic image data reproducing device differ depending on the type thereof. This is conductive to a problem that a regenerative processing time of the dynamic image data reproducing device becomes different depending on the type thereof.

Especially, the optical disk reproducer and the magnetic disk reproducer read the data at random, and, therefore, a rate of dependency on the performances of the processor and of the memory is large.

For example, if the same dynamic image data is reproduced by different types of dynamic image data reproducing devices, the reproducing time may be different. Further, the reproductive process corresponding to a recording time (i.e., the reproductive process in the same reproducing time as the recording time) is inexecutable in some cases.

SUMMARY OF THE INVENTION

It is a primary object of the present invention to provide a method and apparatus capable of reproducing image data for the same duration of time as that of the recording time without depending on performances of a processor and a memory.

The present invention is characterized by omitting a reproductive process of at least a single item of frame data among items of frame data subsequent to an arbitrary item of frame data if an image output time of the arbitrary item of frame data is later than a predetermined image output time.

A method according to this invention comprises a time measuring step of measuring a reproductive processing time taken from a start of reading to an end of outputting of an image per frame data, a predicting step of predicting an image output time of next frame data on the basis of this reproductive processing time, a detecting step of detecting an image output time predetermined per the frame data from the image data, and a determining step of determining the frame data to be reproduced next in accordance with the image output time predicted in the predicting step and the image output time detected in the detecting step.

The detecting step is a step of detecting image output times of N-pieces of frame data from the first frame data stored immediately after the frame data the reproducting process of which has been finished to the Nth frame data stored Nth among the dynamic image data.

Then, the determining step is a step of comparing the image output time predicted in the predicting step with N-pieces of image output times detected in the detecting step and determining the next frame data among the N-pieces of frame data. Specifically, if the image output time predicted in the predicting step is later than an image output time of the (N−1) frame data but earlier than an image output time of the Nth frame data, the (N−1)th frame data is determined as the next frame data. The following is a method of predicting the image output time of the next frame data.

(1) The method comprises a step of presuming a reproductive processing time measured in the time measuring step as a reproductive processing time of the next frame data, and a step of calculating an image output time of the next frame data on the basis of this reproductive processing time.

(2) The method comprises a step of singling out a shorter reproductive processing time from the reproductive processing time of the frame data which has been measured in the time measuring step and the reproductive processing time of the frame data reproduced just before the former frame data, a step of presuming that the shorter reproductive processing time is a reproductive processing time of the next frame data, and a step of calculating an image output time of the next frame data on the basis of this reproductive processing time.

(3) The method comprises a step of calculating, if the reproductive processing time of the frame data which has been measured in the time measuring step is longer than the reproductive processing time of the frame data reproduced just before the former frame data, a difference between the reproductive processing time of the frame data and the reproductive processing time of the frame data theretofore; a step of comparing the difference with a predetermined reference time; a step of presuming, if the difference is shorter than the reference time, that the reproductive processing time of the above-mentioned frame data is a reproductive processing time of the next frame data, and a step of calculating an image output time of the next frame data on the basis of this reproductive processing time.

(4) The method comprises a step of comparing the reproductive processing time of the frame data which has been measured in the time measuring step with the reproductive processing time of the frame data reproduced just before the former frame data; a step of calculating, if the reproductive processing time of the former frame data is longer than the reproductive processing time of the frame data theretofore, a difference between the reproductive processing time of the frame data and the reproductive processing time of the frame data theretofore, a step of comparing the difference with a predetermined reference time, a step of calculating, if the difference is longer than the reference time, a total of the reproductive processing time of the frame data theretofore and the reference time, a step of presuming that this total time is a reproductive processing time of the next frame data, and a step of calculating an image output time of the next frame data on the basis of this reproductive processing time.

Next, the apparatus according to the present invention will be explained.

The apparatus of this invention comprises a reproducing unit for reproducing image data stored on a recording medium according to a frame unit, a time measuring unit for measuring a reproductive processing time required for the reproductive process of each item of frame data by this reproducing unit, a predicting unit for predicting an image output time of next frame data to be reproduced next to the former frame data on the basis of the reproductive processing time measured by this time measuring unit, a detecting unit for detecting an image output time preset per frame data from the image data, and a determining unit for determining the next frame data the basis of the image output time predicted by the predicting unit and the image output time detected by the detecting unit.

The detecting unit detects image output times of N-pieces of frame data from the first frame data stored immediately after the former frame data to the Nth frame data stored Nth from the predetermined recording medium.

The predicting unit has a comparing function to compare the reproductive processing time of the former frame data with the reproductive processing time of the frame data reproduced just before the former frame data. The predicting unit also has a presuming function to presume that the shorter of the two reproductive processing times is a reproductive processing time of the next frame data. The predicting unit further has a calculating function to calculate an image output time of the next frame data on the basis of this reproductive processing time.

The determining unit has a function to compare the image output time predicted by the predicting unit with the N-pieces of image output times detected by the detecting unit and determine the (N−1)th frame data as the next frame data if the image output time predicted by the predicting unit is later than an image output time of the (N−1)th frame data but earlier than an image output time of the Nth frame data.

According to the apparatus of this invention, when reading and image-outputting the image data recorded on the arbitrary recording medium such as a magnetic tape, a magnetic disk, an optical disk, etc., it is possible to prevent a time-lag of the reproductive processing time due to a delay of the reading process or of the image output process. Further, according to the present invention, it is also feasible to restrain a scatter in the reproductive processing time which is produced in every type of image data reproduction control device.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

The present invention will hereinafter be described by way of specific embodiments.

Figure 1:
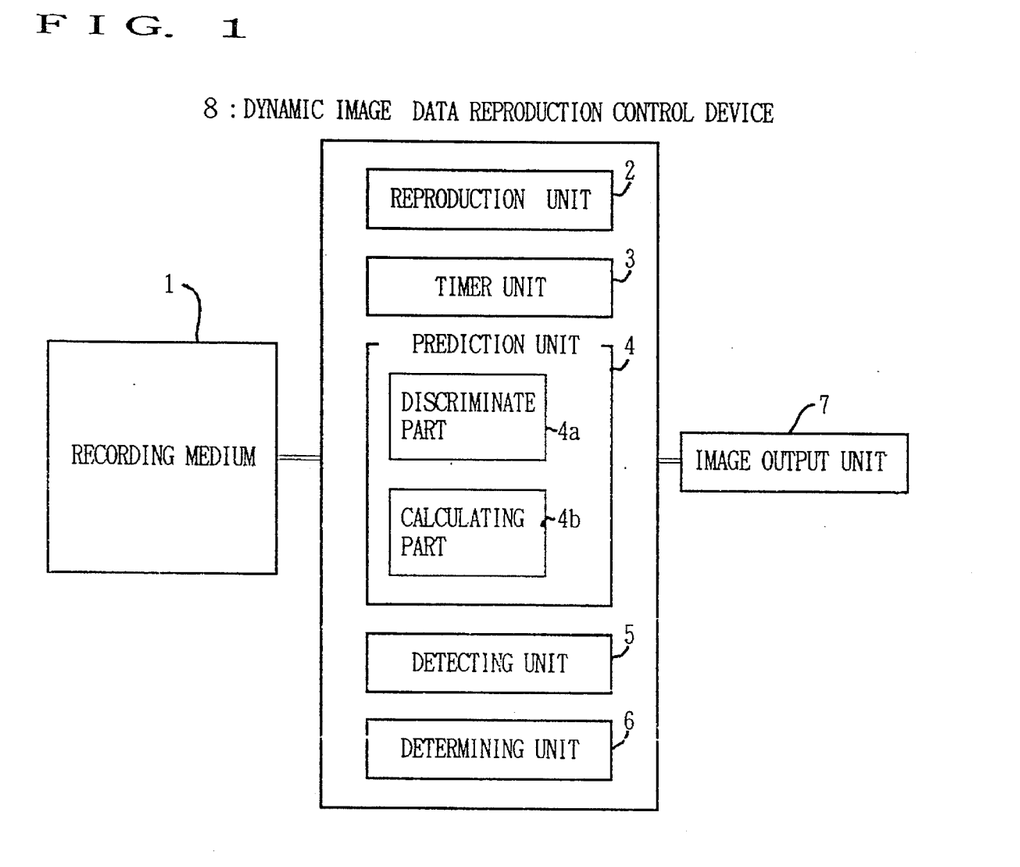
FIG. 1 is a block diagram illustrating a construction in an embodiment 1 of a dynamic image data reproduction control device.

An outline of construction of a dynamic image data reproduction control device 8 in an embodiment 1 will be explained referring to FIG. 1. Note that FIG. 1 is a function-based illustration of the construction of the dynamic image data reproduction control device 8.

The dynamic image data reproduction control device 8 is constructed of a reproducing unit 2, a timer unit 3, a predicting unit 4, a detecting unit 5, and a determining unit 6. The reproducing unit 2 reproduces dynamic image data stored on a recording medium 1 according to a frame unit. The timer unit 3 measure a reproductive processing time required for a reproductive process by this reproducing unit 2 according to the frame unit. The predicting unit 4 predicts an image output time of the next frame data to be reproduced next on the basis of the reproductive processing time measured by the timer unit 3. The detecting unit 5 detects an image output time set per frame data from the dynamic image data described above. The determining unit 6 determines the next frame data on the basis of the image output time predicted by the predicting unit 4 and the image output time detected by the detecting unit 5.

The functions of the respective units will hereinafter be explained in greater detail.

The reproducing unit 2 reads out the dynamic image data stored on the recording medium 1 according to the frame unit. The reproducing unit 2 also outputs this frame data to an image output device 7.

The timer unit 3 starts measuring a time just when the reproducing unit 2 starts reading out the frame data. Then, the timer unit 3 terminates the time measurement just when the reproducing unit 2 outputs the frame data to the image output device 7. That is, the timer unit 3 measures the reproductive processing time taken for the reproduction of each frame data by the reproducing unit 2.

The predicting unit 4 predicts a reproductive processing time of the next frame data to be reproduced next to the relevant frame data. The predicting unit 4 predicts an image output time of the next frame data on the basis of the this reproductive processing time. More specifically, the predicting unit 4 incorporates the following two components:

(1) a discriminant part 4a for comparing the reproductive processing time of the frame data with the reproductive processing time of the frame data reproduced just before the former frame data and discriminating whether the former or the latter is shorter; and (2) a calculating part 4b for calculating an image output time of the next frame data by adding this reproductive processing time to the image output time (reproductive process ending time) of the former framer data on the assumption that the reproductive processing time judged by the discriminant part 4a is identical with the reproductive processing time of the next frame data.

The detecting unit 5 accesses the dynamic image data recorded on the recording medium 1. Subsequently, the detecting unit 5 detects the image output time set per frame data.

The frame data whose image output time is to be detected extends, it is presumed, to the Nth frame data which is stored Nth from the first frame data stored immediately before the former frame data.

The determining unit 6, to start with, compares an image output time T predicted by the predicting unit 4 with N-pieces of image output times $T_1 \sim T_N$ detected by the detecting unit 5. Next, the determining unit 6 seeks an image output time $T_{(N-1)}$ which satisfies the following conditional formula (1):

$$T_{(N-1)} < T < T_N \qquad (1)$$

Then, the determining unit 6 determines that the frame data corresponding to the image output time $T_{(N-1)}$ is defined as the next frame data.

Figure 2:
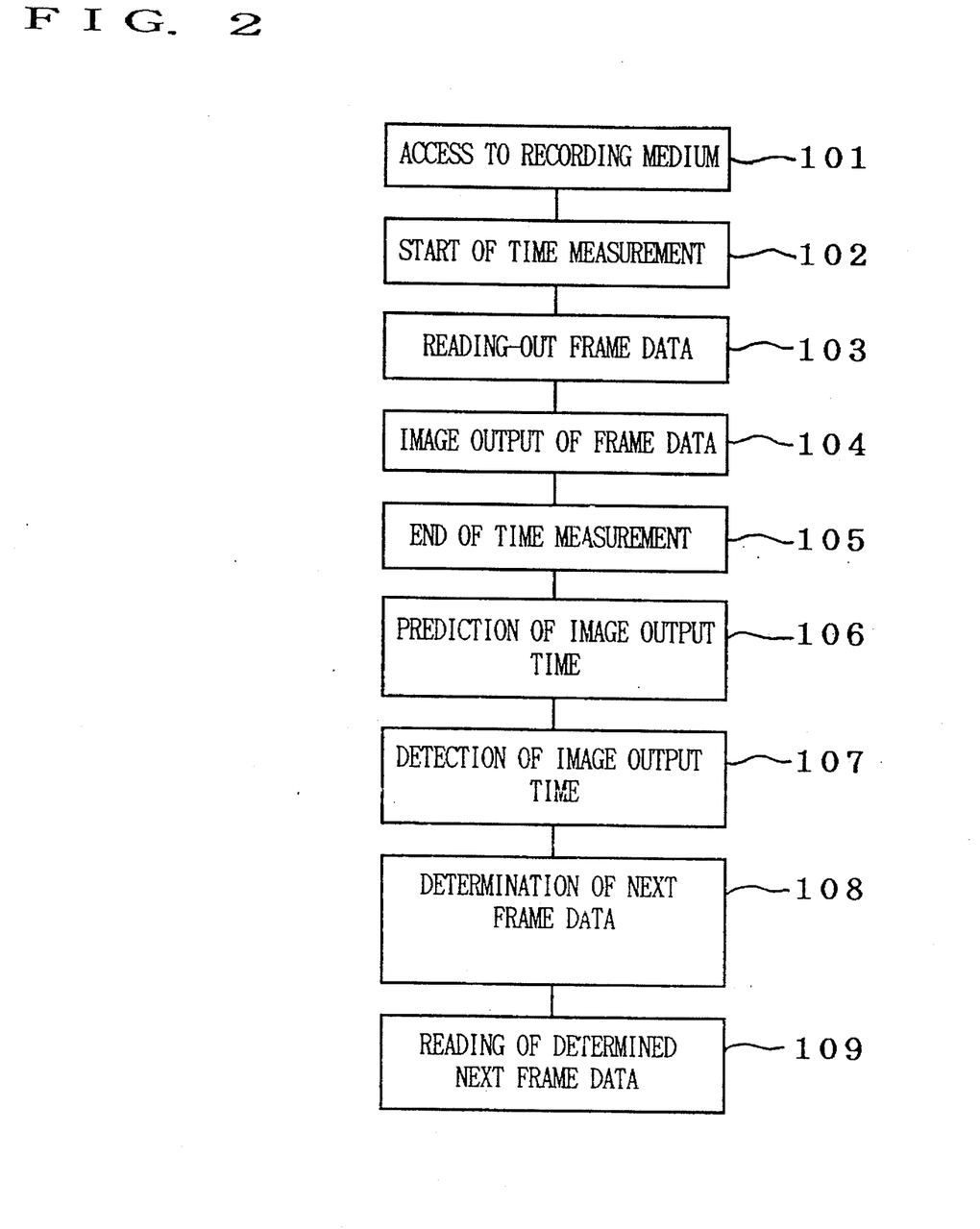
FIG. 2 is a flowchart showing actions in the embodiment 1 of the dynamic image data reproduction control device.

The following is an explanation of the operation of the dynamic image data reproduction control device 8 in conjunction with a flowchart of FIG. 2.

When reproducing the dynamic image data stored on the recording medium 1, the reproducing unit 2 accesses the recording medium 1 (step 101). The timer unit 3 starts measuring the time simultaneously when the reproducing unit 2 starts the reading action (step 102).

The reproducing unit 2 reads the frame data (step 103).

The reproducing unit 2 outputs the frame data read from the recording medium 1 to the image output device 7 (step 104).

The timer unit 3 finishes the time measurement simultaneously with the end of the image output by the reproducing unit 2 (step 105). Further, the timer unit 3 informs the predicting unit 4 of the reproductive processing time of the frame data.

The discriminant part 4a of the predicting unit 4 compares the reproductive processing time informed from the timer unit 3 with the reproductive processing time of the frame data reproduced just before the former frame data. The discriminant part 4a informs the calculating part 4b of the shorter reproductive processing time.

The calculating part 4b presumes that the reproductive processing time informed from the discriminant part 4a is conceived as a reproductive processing time of the next frame data. Then, the calculating part 4b adds the reproductive processing time of the next frame data to the image output time of the former frame data. The calculating part 4b defines an obtained-by-addition time T as an image output time of the next frame data and informs the determining unit 6 of it (step 106).

The detecting unit 5 detects the image output times $T_1 \sim T_N$ of N-pieces of frame data from the dynamic image data on the recording medium 1 (step 107). The detecting unit 5 informs the determining unit 6 of N-pieces of the detected image output times $T_1 \sim T_N$.

The determining unit 6 compares the image output time T informed from the predicting unit 4 with N-pieces of the image output times $T_1 \sim T_N$ informed from the detecting unit.

The determining unit 6 finds out the image output time $T_{(N-1)}$ which meets the conditional formula (1). Then, the determining unit 6 determines that the frame data corresponding to the image output time $T_{(N-1)}$ is defined as the next frame data (step 108).

Hence, the reproducing unit 2 effects the reproduction with an omission of the first frame data through the (N-2)th frame data. A time-lag of the reproductive process can be thereby prevented.

Next, the dynamic image data reproduction control device 8 according to the present invention will be explained more specifically.

Figure 3:
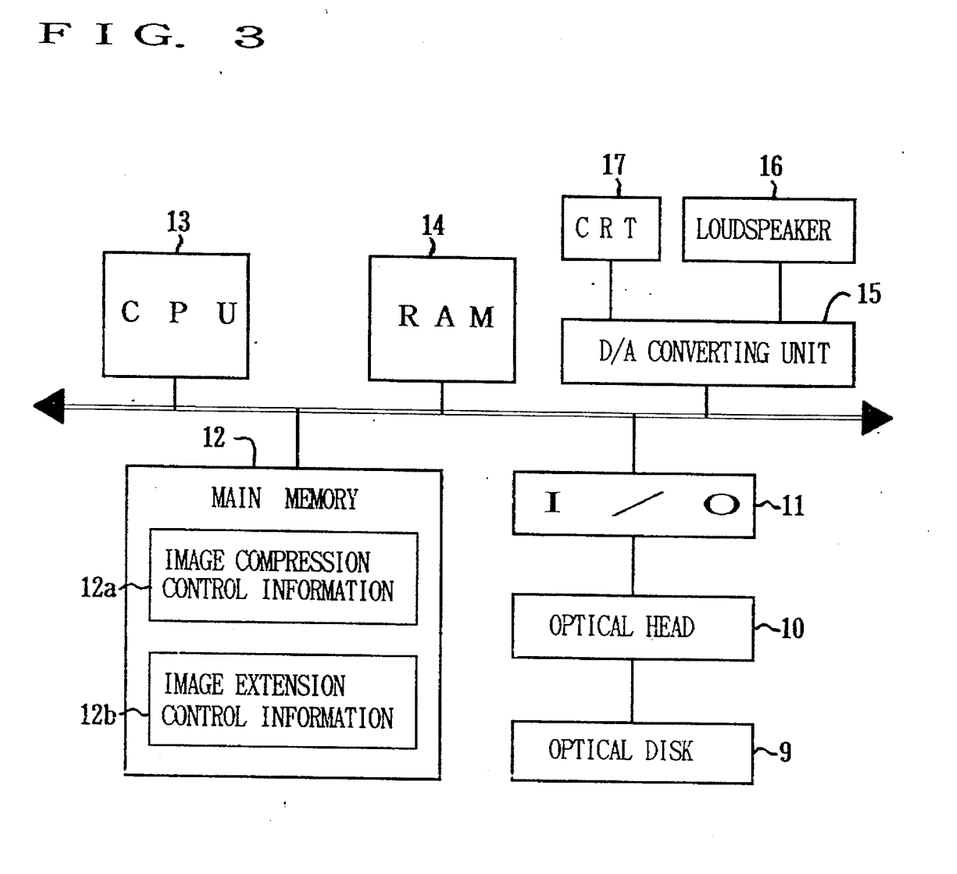
FIG. 3 is a block diagram showing a construction of an embodiment 2 of the dynamic image data reproduction control device.

The construction of the dynamic image data reproduction control device 8 in an embodiment 2 will be explained with reference to FIG. 3.

In this embodiment 2, an optical disk (CD-ROM) is given as a recording medium.

The dynamic image data reproduction control device 8 comprises an I/O circuit (I/O) 11, an optical head 10, a central processing unit (hereinafter referred to as CPU) 13, a main memory 12 and a random access memory (RAM) 14.

The dynamic image data reproduction control device 8 further includes a D/A converting unit 15, a CRT 17 and a loudspeaker 16 which serve to output the dynamic image data and audio data as well.

The main memory 12 stores image compression control information 12a and image extension control information 12b. The main memory 12 further stores an action program (not shown) of the CPU 13.

The CPU 13 processes the dynamic image data on the basis of the action program thereof. Namely, the CPU 13 reproduces the dynamic image data recorded on the optical disk 4. A specific description thereof will be given as below.

Further, the CPU 13 has a function to compress the dynamic image data in accordance with the image compression control information 12a of the main memory 12. The CPU 13 also has a function to extend the dynamic image data in accordance with the image extension control information 12b. These image compression and extension processes are carried out by storing the dynamic image data into the RAM 14 according to a frame unit.

The D/A converting unit 15 converts the frame data undergoing the image extension process in the RAM 14 from digital signals into analog signals. Then, the D/A converting unit 15 outputs the digital-to-analog converted frame data to the CRT 17 as well as to the loudspeaker 16. Videlicet, the CRT 17 image-outputs the dynamic image data outputted by the D/A converting unit 15. The loudspeaker 16 audio-outputs the audio data outputted by the D/A converting unit 15.

Next, the functions of the CPU 13 will be explained referring to FIG. 4.

Figure 4:
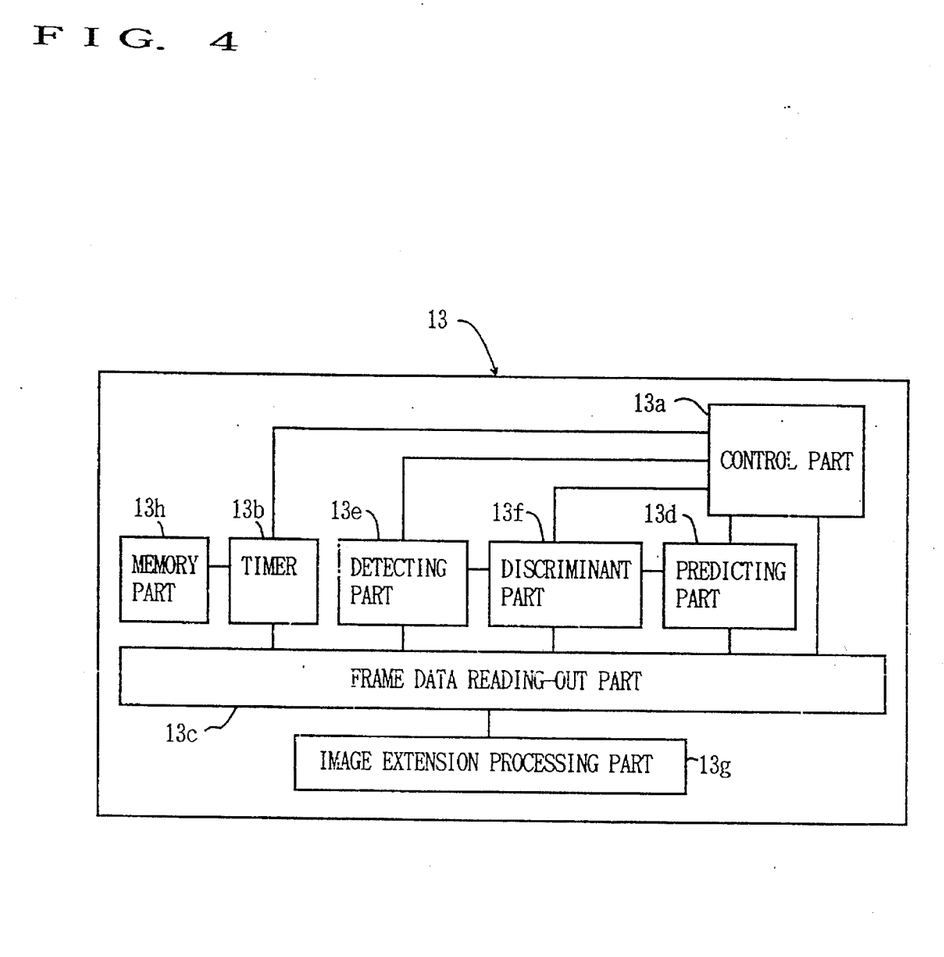
FIG. 4 is a block diagram showing internal function of a CPU.

FIG. 4 is a block diagram showing internal function of the CPU 13.

The internal function of CPU 13 includes a timer 13b, a frame data read-out part 13c, a predicting part 13d, a detecting part 13e, a discriminant part 13f, an image extension processing part 13g, a memory part 13h and a control part 13a.

The frame data read out-part 13c reads out the dynamic image data recorded on the optical disk 4 according to a frame unit. Specifically, the frame data read-out part 13c actuates the optical head 10 and reads out the dynamic image data from the optical disk.

The image extension processing part 13g incorporates a function to extend the frame data read by the frame data read-out part 13c. This image extension processing part 13g performs the extension process in accordance with the image extension control information 12b.

The timer 13b measures a reproductive processing time needed for the reproductive process of each item of the frame data. More specifically, the timer 13b measures a time elapsed from the start of reading out of the frame data to the end of outputting of the image.

The memory part 13h stores in time-series the reproductive processing time measured by the timer 13b. The memory part 13h, further, deletes the data sequentially from the oldest one when the data are stored in all the storage areas.

The detecting part 13e incorporates a function to detect an image display expectation time from each frame. This image display expectation time is a duration for which each item of the frame data is to be image-displayed. More specifically, the image display expectation time is determined based on a time elapsed from an image display time of the frame theretofore up to the image display of the relevant frame. For instance, when the dynamic image data consists of 30 frames in 1 sec, the image display time of the relevant frame is expressed such as T+33.3 (msec), where T (msec) is the image display time of the frame theretofore. Note that this image display expectation time is set when the dynamic image data are recorded on the optical disk 9.

The discriminant part 13f compares the image display expectation time of each frame with an image display predictive time and judge whether this frame is reproduced or not.

The control part 13a controls each part described above on the basis of the action program stored in the main memory 12.

Figure 5:
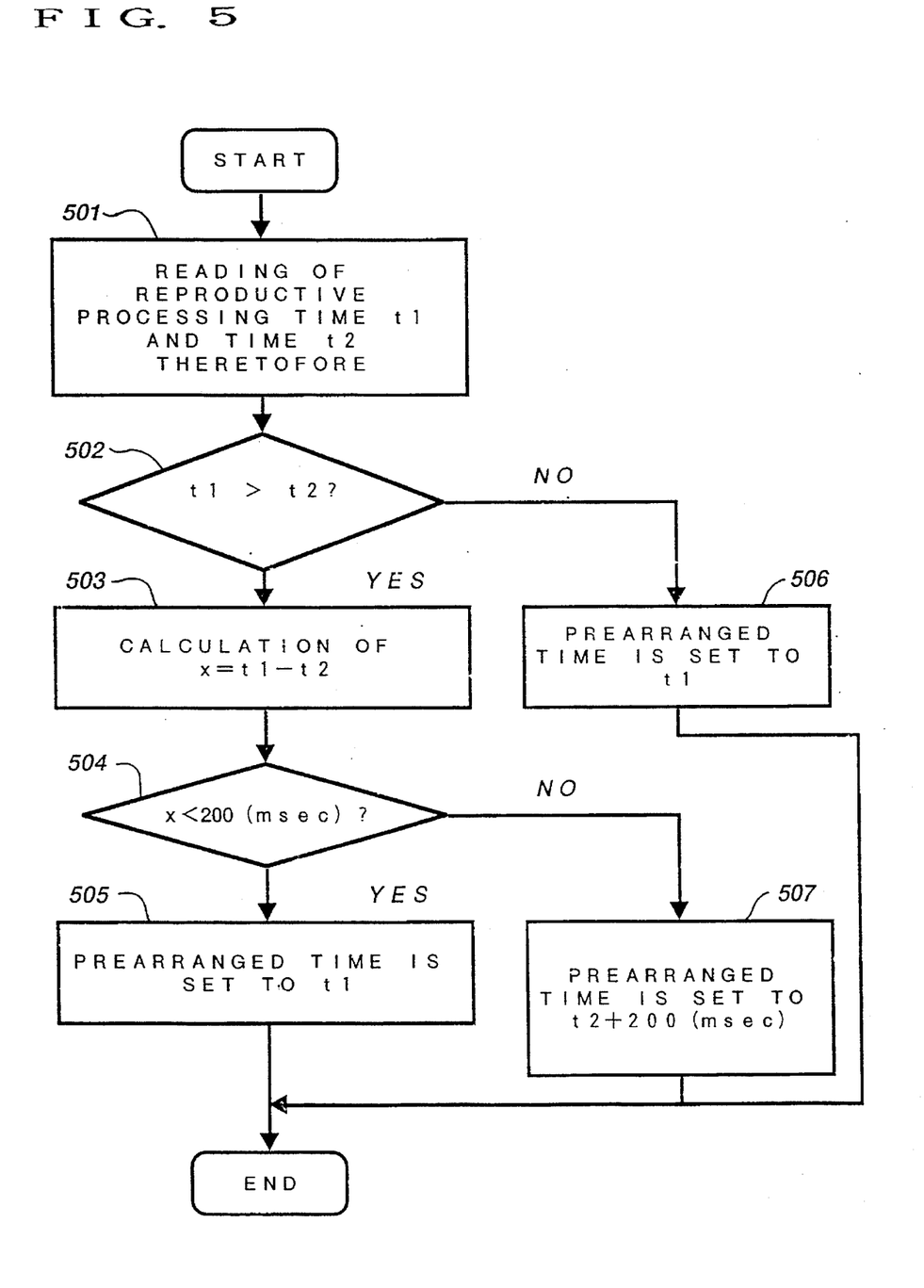
FIG. 5 is a flowchart showing a calculating step by a predicting unit.

FIG. 5 shows a sequence for obtaining the image display predictive time in accordance with this embodiment.

Turning to the same Figure, t1 indicates a time required for the reproductive process of a frame A reproduced just before a prediction target frame. Further, the symbol t2 represents a time needed for the reproductive process of a frame B reproduced just before the frame A.

The predicting part 13d reads each of the reproductive processing times of the frames A, B which have been measured by the timer 13b (step 501). The predicting part 13d compares a length of the reproductive processing time t1 of the frame A with that of the reproductive processing time t2 of the frame B (step 502).

Then, the predicting part 13d, when t1>t2, obtains a difference x between t1 and t2 (step 503). Next, the predicting part 13d compares a magnitude of the difference x with that of a specified value C (step 504).

Herein, if the difference x is less than the specified value C, the predicting part 13d sets a reproductive process prearranged time of the relevant frame to t1 (step 505). Further, the predicting part 13d, if the difference x is equal to or greater than C, sets the reproductive process prearranged time of the relevant frame to (t2 +C) msec (step 507). Additionally, when t1 <t2 in step 502 mentioned above, the predicting part 13d sets the reproductive process prearranged time of the relevant frame to t1 (step 506).

It is to be noted that the specified value is set to 200 msec in this embodiment.

Figure 6:
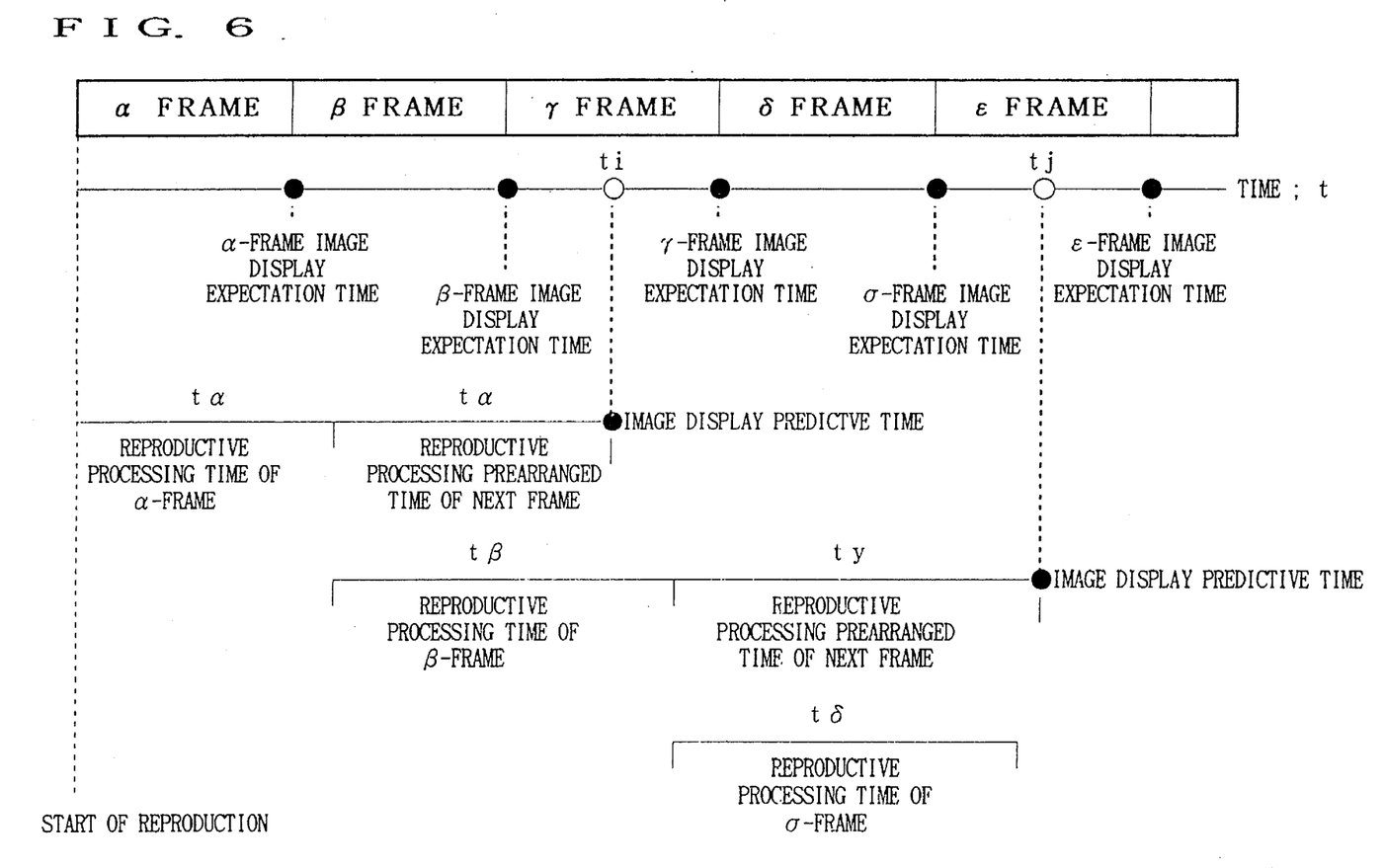
FIG. 6 is a sequence diagram showing action steps by a discriminant unit.

FIG. 6 is a sequence diagram of discriminating steps by the discriminant part 13f in this embodiment.

FIG. 6 shows actions of the discriminant part 13f when starting the reproduction from a frame α.

The timer 13b measures a reproductive processing time tα taken for reproducing the frame α. Subsequently, the timer 13b permits the memory part 13 to store the reproductive processing time of the frame α.

Next, the predicting part 13d reads the reproductive processing time tα of the frame α which has been stored in the memory part 13h after an end of the reproductive process of the frame α. A reproductive process prearranged time of the next frame is set to tα.

Herein, the discriminant part 13f sets a time ti after the reproductive process prearranged time tα has elapsed from the present time as an image display predictive time of the next frame. The discriminant part 13f compares this image display predictive time ti with the image display expectation time detected by the detecting part 13e. At this moment, the image display predictive time ti is later than an image display expectation time of a frame β but earlier than an image display expectation time of a frame γ. Namely, the image display predictive time ti does not exceed the reproductive processing time of the frame β. Then, the discriminant part 13f informs the image extension processing part 13g of targeting the frame β for the frame data to be reproduced next.

Next, the timer 13b measures a reproductive processing time tβ taken for the frame β. The timer 13b permits the memory part 13h to store the reproductive processing time tβ of the frame β. Then, the predicting part 13d reads, from the memory part 13h, the reproductive processing time tα of the frame α and the reproductive processing time tα of the frame a reproduced just before the frame β. Subsequently, the predicting part 13d calculates a reproductive process prearranged time ty of a frame to be reproduced next in accordance with a flow of actions shown in FIG. 4.

Herein, the discriminant part 13f sets a time tj after the reproductive process prearranged time ty has passed from the present time as an image display predictive time of the next frame. The discriminant part 13f compares this image display predictive time tj with the image display expectation time detected by the detecting part 13e. In this case, the image display predictive time tj is later than an image display expectation time of a frame δ but earlier than an image display expectation time of a frame ε. Namely, the image display predictive time tj does not exceed the reproductive processing time of the frame δ. The discriminant part 13f informs the image extension processing part 13g of targeting the frame δ for the next reproductive frame. The reproductive process of the frame γ is not thereby conducted.

Incidentally, if the image display predictive time tj given above is later than the ε-frame image display time, the γ- and δ-frame reproductive processes are omitted.

Figure 7:
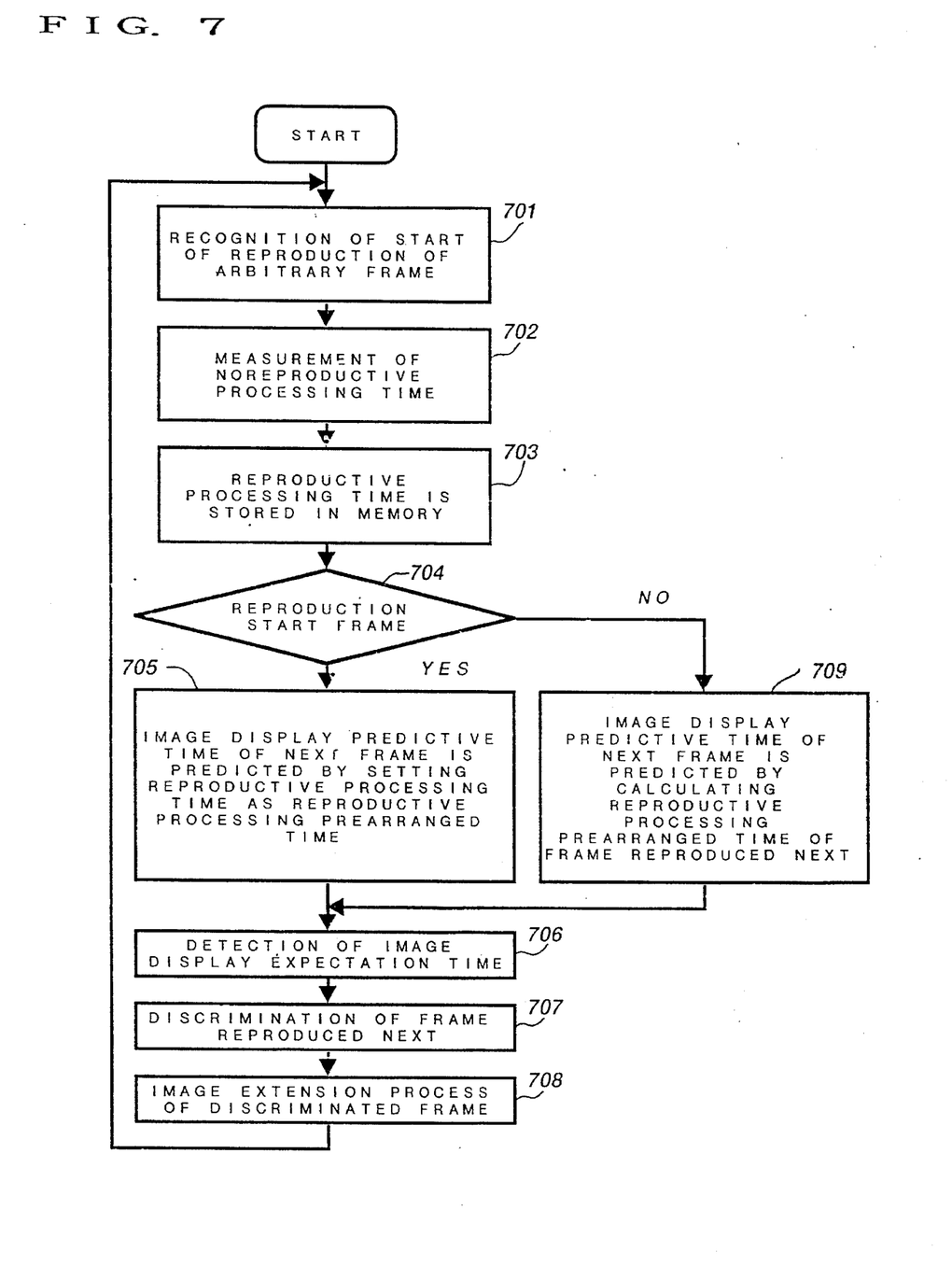
FIG. 7 is a flowchart showing action steps of the dynamic image data reproduction control device.

Next, the action steps of the CPU 13 in this embodiment will be explained based on a flowchart of FIG. 7.

The control part 13a recognizes a start of reproduction of an arbitrary frame (step 701). The control part 13a actuates the timer 13b. The timer 13b measures the reproductive processing time required for reproducing the relevant frame (step 702).

Then, the control part 13a causes the timer 13b to stop measuring the time at the end of the reproductive process of the relevant frame, i.e., when finishing the extension process of the relevant frame by an extension processing part 9g. The timer 13b permits the memory part 13h to store the reproductive processing time of the relevant frame (step 703).

Herein, the control part 13a judges whether the relevant frame is defined as a reproduction starting frame or not (step 704). The control part 13a informs, if affirmative, the predicting part 13d of the fact that the relevant frame is the reproduction starting frame.

The predicting part 13d reads the reproductive processing time of the relevant frame from the memory part 13h.

Next, the predicting part 13d presumes that the reproductive processing time is a reproductive process prearranged time of a frame to be reproduced next to the relevant frame. The predicting part 13d thus predicts an image display predictive time of the next frame (step 705). Then, the predicting part 13d informs the discriminant part 13f of this image display predicting time.

Concurrently with the action of the predicting part 13d, the detecting part 13e detects an image display expectation time of a frame subsequent to the relevant frame through a frame read-out part 13c (step 706). The detecting part 13e informs the discriminant part 13f of the image display expectation time.

The discriminant part 13f compares the image display predictive time informed from the predicting part 13d with the image display expectation time informed from the detecting part 13e. The detecting part 13e executes a process corresponding to the sequence shown in the diagram of FIG. 5, and the frame to be reproduced next is singled out (step 707).

Subsequently, the image extension processing part 13g effects an image extension process for the frame singled out by the discriminant part 13f. The image extension processing part 13g outputs the frame data undergoing the image extension process to the D/A converting unit 15 (step 708).

Herein, if the relevant frame is not identical with the reproductive start frame in step 704 mentioned above, the predicting part 13d reads, from the memory part 13h, the reproductive processing time of the relevant frame and the reproductive processing time of the frame subjected to the reproductive process just before the relevant frame. Based on these two reproductive processing times, the predicting part 13d executes a process corresponding to the action shown in the flowchart of FIG. 4 Given above. Then, the predicting part 13d calculates a reproductive process prearranged time of the frame to be reproduced next to the relevant frame. Next, the predicting part 13d predicts the image display predictive time of the next frame on the basis of the reproductive process prearranged time (step 709). Then, the predicting part 13d informs the discriminant part 13f of the image display predictive time, and the same processes as those subsequent to step 706 are carried out.

As discussed above, according to this embodiment, the time-lag in the frame reproduction is prevented, and, simultaneously, it is possible to restrain a scatter in terms of the reproductive processing time which is to be caused in every type of the reproducing units.

Note that this embodiment aims at the optical disk, however, the same processing can be effected for a magnetic disk or a video tape.

It is apparent that, in this invention, a wide range of different working modes can be formed based on the invention without deviating from the spirit and scope of the invention. This invention is not restricted by its specific working modes except being limited by the appended claims.

What is claimed is:

1. A method of controlling reproduction, by a dynamic image data reproduction control device comprising a central processing unit, said central processing unit coupled to a predetermined recording medium, of image data stored in the predetermined recording medium, said method comprising:

a read-out step for forming frame data by reading out by the central processing unit said image data from the predetermined recording medium according to a frame unit;

an image outputting step for image-outputting by the central processing unit to an image output unit the frame data read out in said read-out step;

a time measuring step for measuring by the central processing unit a reproductive processing time taken from a start of reading out in said read-out step to an end of outputting of an image in said image outputting step according to the frame unit, said end occurring when the central processing unit outputs the image to the image output unit;

a predicting step for predicting by the central processing unit an image output time of next frame data being reproduced after said frame data based on said reproductive processing time measured in said time measuring step;

a detecting step for detecting from said image data and by the central processing unit an image output time established per said frame data; and a determining step for determining by the central processing unit the next frame data being reproduced after said frame data in accordance with said image output time predicted in said predicting step and said image output time detected in said detecting step.

2. The method according to claim 1, wherein said detecting step comprises a step for detecting image output times of N-pieces of frame data from a first frame data stored immediately after said frame data to an Nth frame data stored Nth among said image data.

3. The method according to claim 2, wherein said determining step comprises:

a step for comparing said image output time predicted in said predicting step with said N-pieces of image output times detected in said detecting step, and a step for determining that said next frame data is an (N−1)th frame data if said image output time predicted in said predicting step is later than an image output time of said (N−1)th frame data but earlier than an image output time of said Nth frame data.

4. The method according to claim 1, wherein said predicting step comprises:

a step for presuming a reproductive processing time measured in said time measuring step as a reproductive processing time of said next frame data, and a step for calculating an image output time of said next frame data based on said reproductive processing time of said next frame data.

5. The method according to claim 1, wherein said predicting step comprises:

a discriminating step for discriminating a shorter reproductive processing time by comparing said reproductive processing time of current frame data with said reproductive processing time of previous frame data reproduced just before current frame data, and a calculating step for calculating an image output time of said next frame data based on said reproductive processing time on an assumption that said reproductive processing time discriminated in said discriminating step is a reproductive processing time of said next frame data.

6. The method according to claim 1, wherein said predicting step comprises:

a step for comparing said reproductive processing time of current frame data with said reproductive processing time of previous frame data reproduced just before said current frame data, a step for calculating, if said reproductive processing time of said frame data is longer than said reproductive processing time of said frame data reproduced just before said frame data, a difference between said reproductive processing time of said frame data and said reproductive processing time of said frame data reproduced just before said frame data, a step for comparing said difference with a predetermined reference time, a step for presuming, if said difference is shorter than said reference time, that said reproductive processing time of said frame data is a reproductive processing time of said next frame data, and a step for calculating an image output time of said next frame data based on said reproductive processing time of said next frame data.

7. The method according to claim 1, wherein said predicting step comprises:

a step for comparing said reproductive processing time of current frame data with said reproductive processing time of previous frame data reproduced just before said current frame data;

a step for calculating, if said reproductive processing time of said frame data is longer than said reproductive processing time of said frame data reproduced just before said frame data, a difference between said reproductive processing time of said frame data and said reproductive processing time of said frame data reproduced just before said frame data;

a step for comparing said difference with a predetermined reference time;

a step for calculating, if said difference is longer than said reference time, a total of said reproductive processing time of said frame data reproduced just before said frame data and said reference time;

a step for presuming that said total time is a reproductive processing time of said next frame data; and a step for calculating an image output time of said next frame data on the basis of said reproductive processing time of said next frame data.

8. An apparatus for controlling reproduction of image data, comprising:

reproducing means for forming and outputting frame data by reading out said image data from a predetermined recording medium according to a frame unit;

time measuring means for measuring a reproductive processing time required for forming and outputting the frame data by said reproducing means;

predicting means for predicting an image output time of next frame data being reproduced after said frame data based on said reproductive processing time measured by said time measuring means;

detecting means for detecting from said image data an image output time established per said frame data; and determining means for determining said next frame data being reproduced after said frame data based on said image output time predicted by said predicting means and said image output time detected by said detecting means.

9. The apparatus according to claim 8, wherein said detecting means detects image output times of N-pieces of frame data from a first frame data stored immediately after said frame data to an Nth frame data stored in an Nth position from said recording medium.

10. The apparatus according to claim 9, wherein said determining means compares said image output time predicted by said predicting means with said N-pieces of image output times detected by said detecting means and establishes an (N–1)th frame data as said next frame data if said image output time predicted by said predicting means is later than an image output time of said (N–1)th frame data but earlier than an image output time of said Nth frame data.

11. The apparatus according to claim 8, wherein said predicating means presumes that said reproductive processing time of said frame data is a reproductive processing time of said next frame data being reproduced next and calculates an image output time of said next frame data on the basis of said reproductive processing time.

12. The apparatus according to claim 8, wherein said predicting means comprises:

discriminating means for discriminating a shorter reproductive processing time by comparing said reproductive processing time of current frame data with said reproductive processing time of previous frame data produced just before said current frame data, and calculating means for calculating an image output time of said next frame data based on said reproductive processing time on an assumption said reproductive processing time discriminated by said discriminating means is a reproductive processing time of said next frame data.

* * * * *